United States Patent [19]
Verbeski

[11] Patent Number: 5,253,896
[45] Date of Patent: Oct. 19, 1993

[54] HARNESS ANCHORAGE REINFORCEMENT FOR A CONVERSION VAN

[75] Inventor: Andrew Verbeski, Milwaukee, Wis.

[73] Assignee: The Compliance Group, Inc., Milwaukee, Wis.

[21] Appl. No.: 771,623

[22] Filed: Oct. 4, 1991

[51] Int. Cl.⁵ .............................................. B60R 22/00
[52] U.S. Cl. .................. 280/808; 280/801 R
[58] Field of Search ...................... 280/801, 804, 806

[56] References Cited

U.S. PATENT DOCUMENTS 3,810,657  5/1974  Campbell ........................... 280/808
4,725,076  2/1988  Taylor ................................ 280/808
4,915,413  4/1990  Meyer .................................. 280/808
4,971,359  11/1990 Takanashi et al. .................. 280/808

*Primary Examiner*—Kenneth R. Rice
*Attorney, Agent, or Firm*—Nilles & Nilles

[57] ABSTRACT

This invention relates to a harness anchorage reinforcement for a conversion van having a bay window. A harness reinforcement beam extends along the underside of the upper roof rail of the van from the driver's door post to the second forwardmost vertical side wall column. Upward extending tabs on the beam are engaged to the receptor plate of a harness retractor assembly, and to the upper roof rail, and to reinforcing back plates on the roof rail.

8 Claims, 4 Drawing Sheets

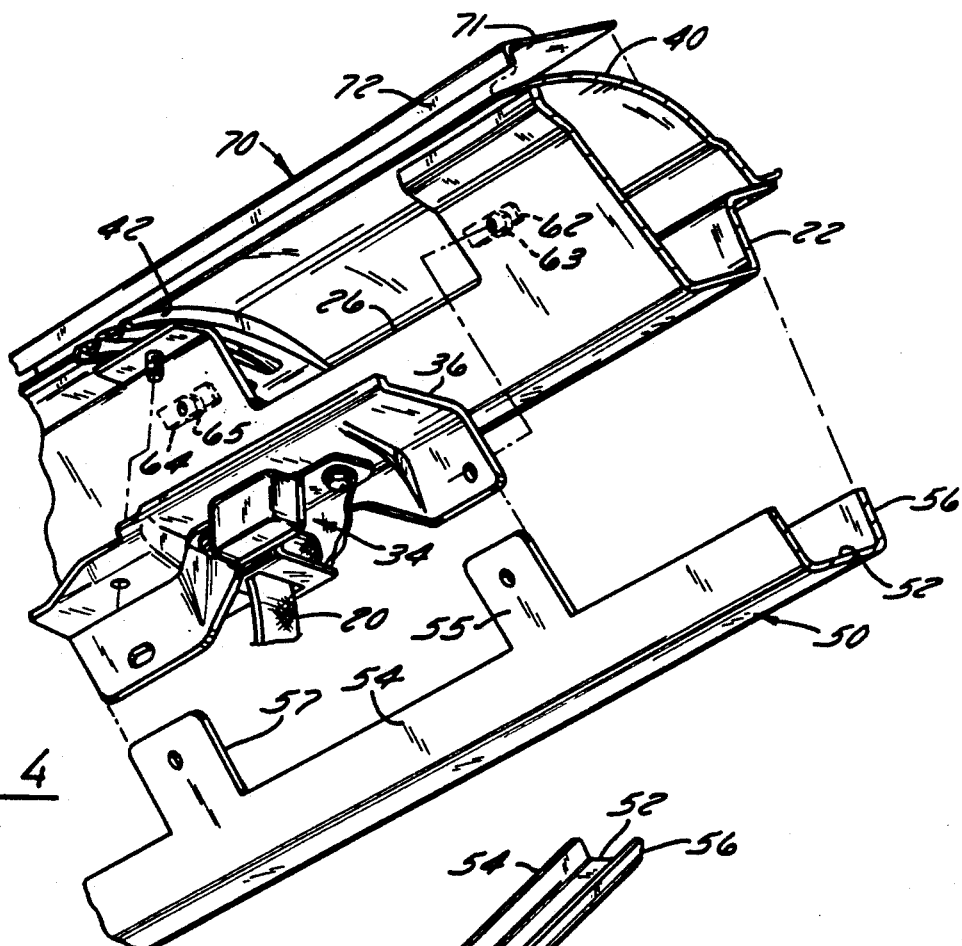
FIG. 4
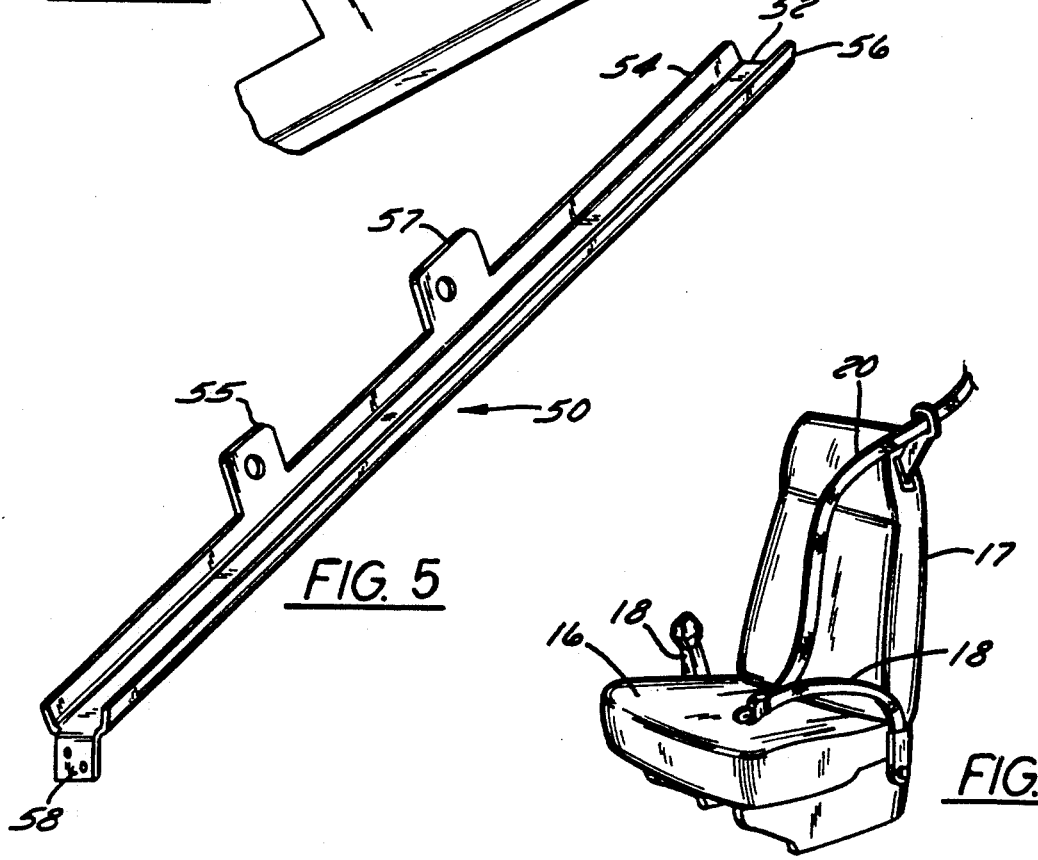
FIG. 5
FIG. 3

HARNESS ANCHORAGE REINFORCEMENT FOR A CONVERSION VAN

BACKGROUND OF THE INVENTION

FIELD OF THE INVENTION

This invention relates to a reinforcement of a seat belt anchorage, and specifically to a reinforcement beam for reinforcing the anchorage of the driver's shoulder harness on a conversion van. This invention relates to a harness anchorage reinforcement beam itself, to a conversion van including a reinforcement of the driver's harness anchorage, and to a method of reinforcing the driver's harness anchorage in a conversion van.

BACKGROUND OF THE RELATED ART

The term "conversion van" refers to an incomplete van type vehicle supplied by an automotive manufacturer and which has been outfitted by a second stage manufacturer with specialty interior components. An incomplete vehicle is supplied by the manufacturer as a mechanically fully functioning van. The unconverted, bare metal shell van is factory equipped with front driver and passenger seats, seat belts and anchorages. No other interior components are provided with the incomplete vehicle.

The passenger compartment of the van is defined by the floor, two sidewalls and roof of the vehicle. Upper roof rails located at the upper corner of the compartment extend from the front to the rear of the vehicle. An upper roof rail is located on each of the driver's and passenger's sides of the van. The sheet metal sidewalls of the van are further supported by vertical sidewall columns spaced apart at several locations along the side of the vehicle. The vertical side wall columns extend from the floor up to the upper roof rails. The thin sheet metal roof is further supported by several roof beams which extend across the width of the vehicle from the driver side upper roof rail to the passenger side upper roof rail.

The second stage manufacturer, or conversion company, equips the van with all of the necessary interior components, such as an audio system, upholstery, seating, wood finishes and electrical components. A conversion company often installs an oversized window, referred to as a bay window, in the sidewall of the van. A conversion company may also install a raised roof, meaning a customized roof which extends vertically higher than the roof of an unconverted vehicle. Installation of a bay window requires removal of a substantial portion of the sidewall of the van and typically requires removal of one or several of the vertical sidewall columns. Installation of a raised roof requires cutting out a substantial portion of the roof and typically requires removal of at least some of the roof beams. A conversion company is permitted to remove these structural frame members of the van so long as the completed vehicle complies with Federal Motor Vehicle Safety Standards, and particularly FMVSS Standard Nos. 207 through 210.

Federal standards as applied to conversion vans have been recently amended. In response to the upgraded standards, one manufacturer of incomplete vehicles, General Motors (GM), has modified the anchorage point for the driver's shoulder harness. The driver's shoulder harness is connected to a harness retractor assembly. The retractor assembly is bolted to a retractor receptor plate. The receptor plate is fastened to the driver side upper roof rail. In order to install the retractor assembly and receptor plate, GM cutaway a portion of the driver side upper roof rail. The cutout portion is located close to a point where the forward most vertical side wall column meets the driver side upper roof rail, and close to the point where the second forwardmost roof beam meets the driver side upper roof rail. Despite the fact that the cut out portion has weakened that point of the upper roof rail, the driver's harness anchorage on an unmodified van complies with Federal Standards so long as the remaining structural elements are intact.

In view of the weak point in the upper roof rail, GM has placed restrictions on the modifications a conversion company may make to the vehicle. So that the front seat belts of a completed vehicle will conform to the requirements of federal standards, GM requires a conversion company to provide a front seating system which has the same location, construction and vital spatial relationships as the seating system offered by GM in an unconverted vehicle; to make no alterations to the number, placement installation or model number of the seat belt assemblies provided by GM; to make no modifications to the vehicle frame or roof structure; and, GM requires that the installation of a side window or a raised roof must provide structural strength equal to or greater than that of an unmodified body.

The restrictions mean that a conversion company may not remove the vertical sidewall column located next to the driver's harness anchorage so as to install an enlarged bay window, and the converter may not remove the roof beam located next to the driver's harness anchorage so as to install a raised roof at that location.

SUMMARY OF THE INVENTION

A reinforcement of the driver's harness anchorage point in a conversion van including a bay window, or including a bay window and raised roof, is disclosed. The invention disclosed herein relates to a harness anchorage reinforcement beam itself, to a van including a reinforcement of the driver's harness anchorage, and to a method of reinforcing the driver's harness anchorage.

The invention enables a conversion company to remove the forwardmost vertical sidewall column on the driver's side of the vehicle so as to permit installation of a bay window. The invention further allows a van converter to remove the roof up to the forwardmost roof cross beam and to remove the roof cross beams from the forwardmost beam to the rear of the vehicle (including the second forwardmost roof cross beam), so as to permit installation of a raised roof.

The invention reinforces the cut-away portion of the upper roof rail where the driver's harness retractor assembly and retractor receptor plate are attached. The invention satisfies all of GM's restrictions. Specifically, the invention provides a reinforcement of the driver's harness anchorage which meets or exceeds federal standards, and it provides structural strength equal to or greater than that of an unmodified body.

The primary objects of the invention are therefore to provide a harness anchorage reinforcement in a conversion van which will strengthen GM's modified harness anchorage conversion company may make to the vehicle; to provide a conversion van which has a bay window and which the structural support of the driver's harness anchorage meets or exceeds the structural strength of an unmodified vehicle; to provide a driver's harness anchorage which meets or exceeds federal safety standards; and to provide a method of reinforcing the driver's harness anchorage on a converted GM van.

Other objects and advantages of the invention will become apparent from the following description which, taken in connection with the accompanying drawings, set forth by way of illustration and example certain embodiments of this invention.

BRIEF DESCRIPTION OF THE DRAWINGS

The drawings, which constitute part of the specification and includes exemplary embodiments of the invention, include the following:

FIG. 3 is a perspective view of a driver's front seat with a lap belt and shoulder belt combination;

FIG. 4 is a partial, exploded perspective view of the driver's harness retractor assembly and reinforcement;

FIG. 5 is a perspective view of a harness reinforcement beam in accordance with the invention;

DETAILED DESCRIPTION

Referring to FIG. 3, the seat belt assembly of the front driver's seat 16 has the lap belt 18 anchored on the lower left-hand and lower right-hand sides of the seat, respectively. A shoulder harness 20 extends across the torso area and the left shoulder area of the driver's position of the vehicle. The end of the shoulder harness 20 is anchored in the upper roof rail 22 of the van, as shown in FIG. 2.

Figure 1:
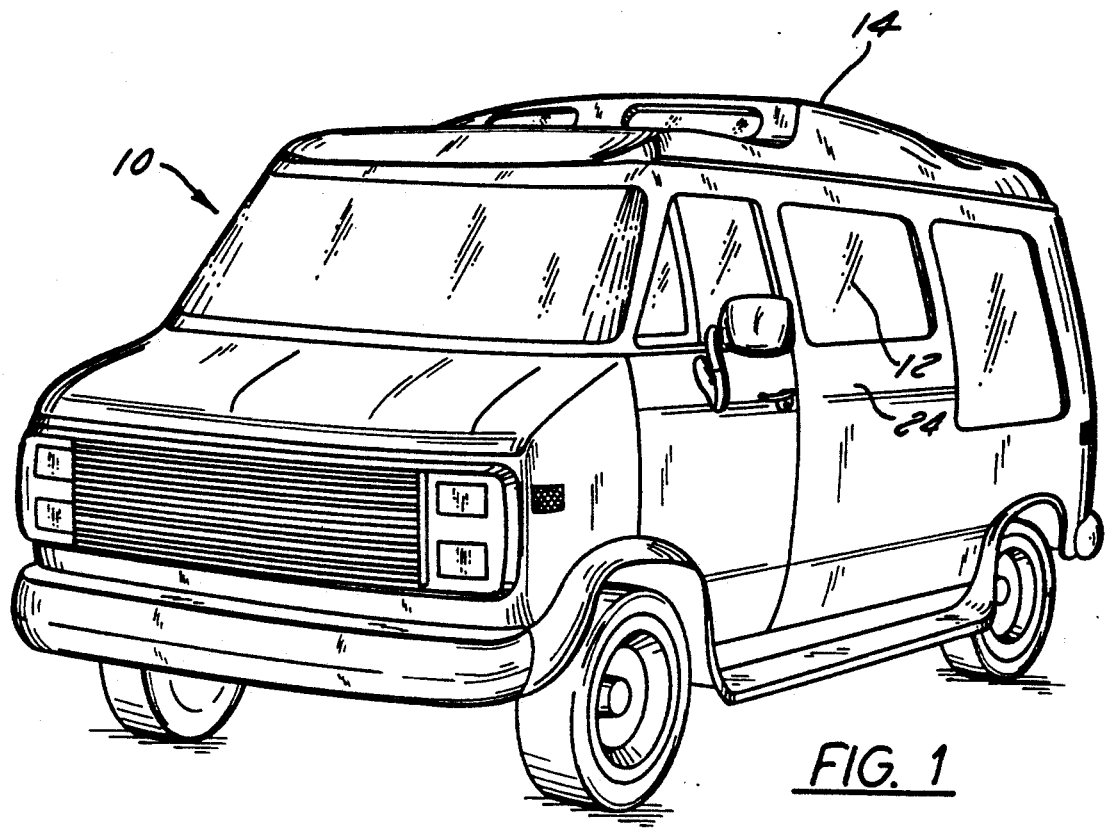
FIG. 1 is a perspective view of a converted GM van having an enlarged bay window and a raised roof.
Figure 2:
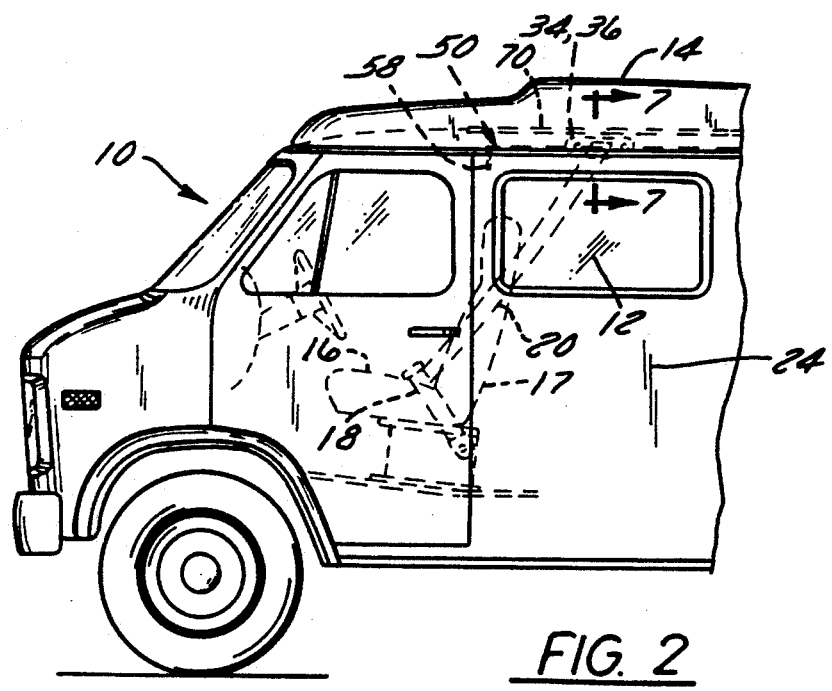
FIG. 2 is a partial side elevational view showing the location of the driver's seat, seat belt and harness retractor assembly.
Figure 9:
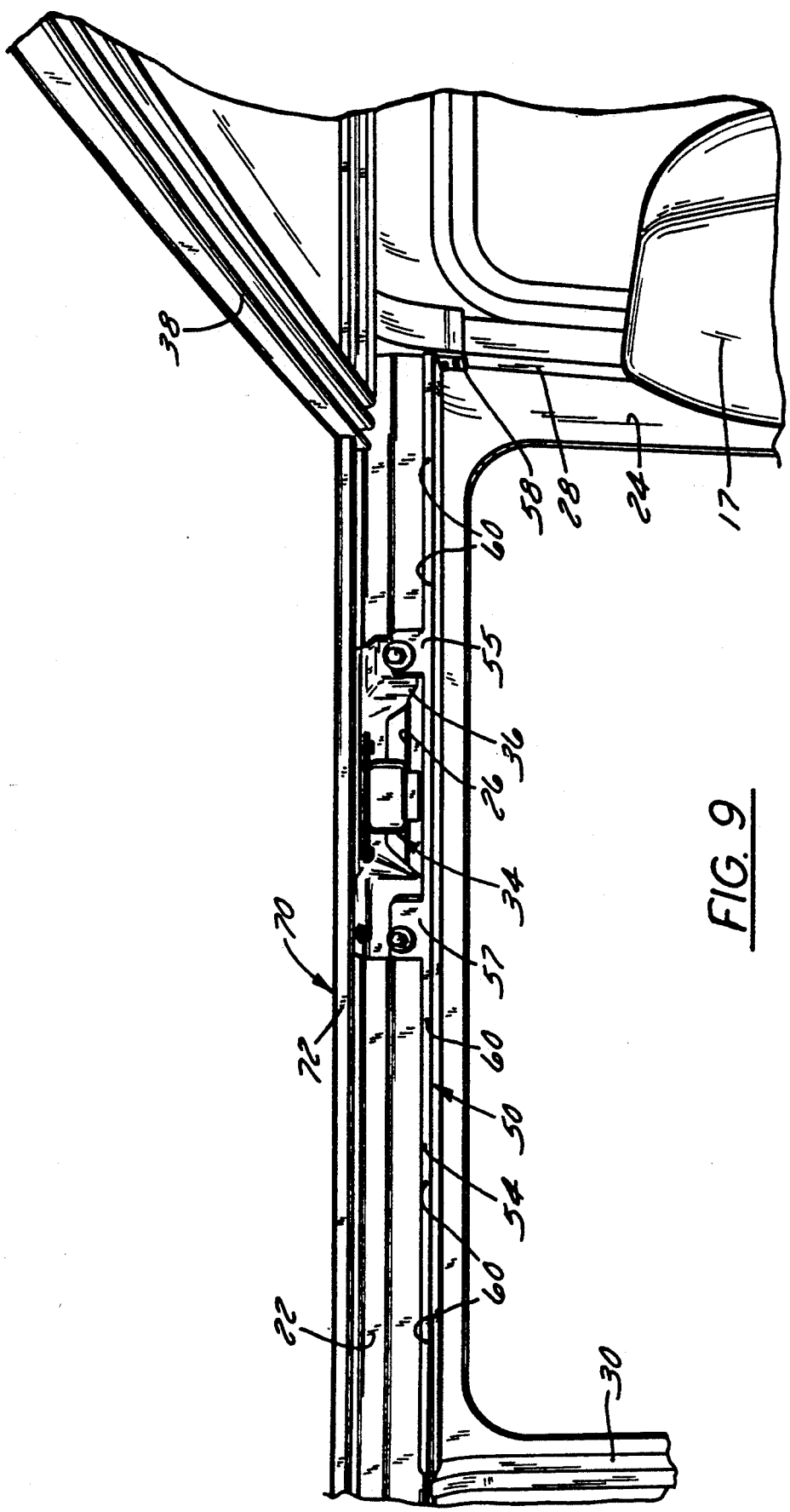
FIG. 9 is a partial, interior perspective view showing the harness retractor assembly with a reinforcement in accordance with the invention.

As can be seen in FIGS. 1, 2 and 9, installation of a bay window 12 requires a conversion company to cutout a large section of the side wall 24 of the van. The cutout section extends approximately from the driver's door post 28 to the second forwardmost vertical side wall column 30. Installation of such a bay window 12 requires removal of the forwardmost vertical side wall column.

A raised roof 14 ordinarily extends from the rear of the vehicle up to the forwardmost roof beam 38, as shown in FIGS. 1, 2 and 9. This point is approximately even with the seat backs 17 of the front driver and passenger seats. Installation of such a raised roof 14 requires removal of the thin sheet metal roof 40 from the rear of the vehicle up to the forwardmost roof beam 30, and across the width of the vehicle from the driver's upper roof rail 22 to the passenger's upper roof rail. The roof beams, including the second forwardmost roof 42 beam located approximately adjacent to the rear portion of the harness retractor receptor plate, are also removed. FIG. 4 shows the cutoff end and remaining stub portion of the second forwardmost roof beam 42.

A harness anchorage reinforcement beam 50 as shown in FIG. 5 is made from an elongated metal channel having a middle portion 52 and an upward extending interior side edge 54 and an upward extending exterior side edge 56 and forming a U-shaped cross section extending the length of the beam 50. The length of the beam 50 corresponds to the distance between the driver's door post 28 and the second forwardmost vertical side wall column 30 of the van. A tab or flange 58 on one end of the beam 50 extends downward in a direction opposite the side edges 54 and 56 of the U-shaped cross section. On the interior side edge 54 of the beam 50 are two upward projecting tabs 55 and 57. The distance between the tabs 55 and 57 corresponds to the length of the harness retractor assembly 34 and to the cutout portion 26 of the upper roof rail 22.

The harness anchorage reinforcement beam 50 is installed on the underside of the upper roof rail 22. The harness anchorage reinforcement beam 50 is preferably riveted at several locations 60 to the roof rail 22, although it may be bolted, screwed, or otherwise attached so long as it is securely fastened to the roof rail 22. The down turned flange 58 is bolted or otherwise securely fastened to a driver's door post 28.

Figure 7:
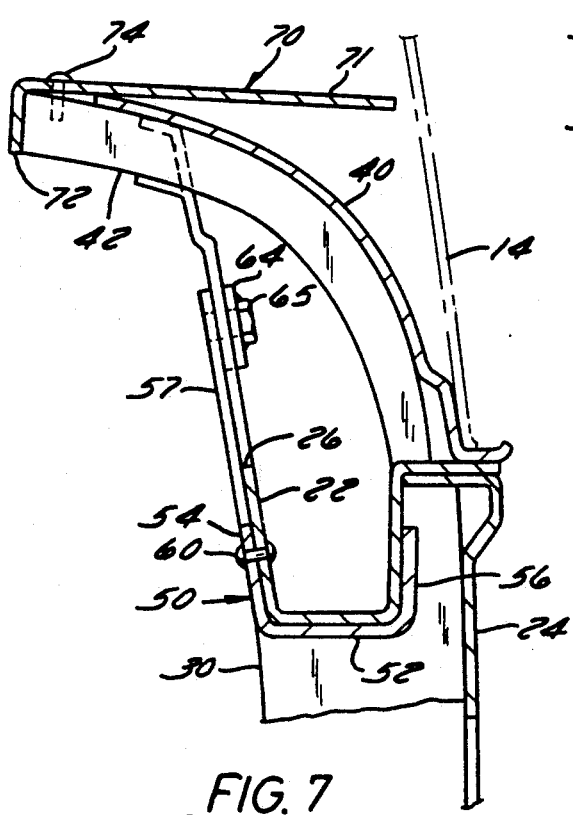
FIG. 7 is a sectional view of the upper roof rail, harness reinforcement beam and roof reinforcement beam taken at line 7—7 of FIG. 2.
Figure 8:
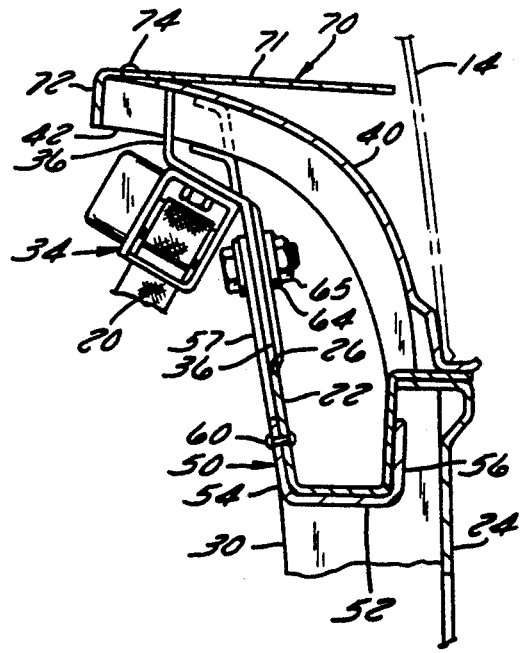
FIG. 8 is a sectional view the same as FIG. 7 and further showing a harness retractor assembly.

Referring to FIGS. 4, 7 and 8, rectangular reinforcing back plates 62 and 64 with a bolt hole and a threaded nut welded to one side of each plate is installed behind the upper roof rail 22. One reinforcing back plate 62 is placed forward of the cutout portion 26 of the upper roof rail 22, and another back plate 64 is placed rearward of the cutout portion. Each reinforcing back plate 62 and 64 has a bolt hole and a threaded nut 63 and 65 on one side of the plate.

The upper end of the driver's shoulder harness 20 extends from and retracts into a harness retractor assembly 34. The harness retractor assembly 34 is bolted to a retractor receptor plate 36. Referring to FIGS. 4, 8 and 9, the retractor receptor plate 36 has an indented center portion which fits into the cutout portion 26 of the upper roof rail 22. The forward portion of the retractor receptor plate 36 fits against the upper roof rail 22 forward of the cutout portion 26; the rear section of the retractor receptor plate 36 fits against the upper frame rail 22 rearward of the cutout portion 26.

Figure 6:
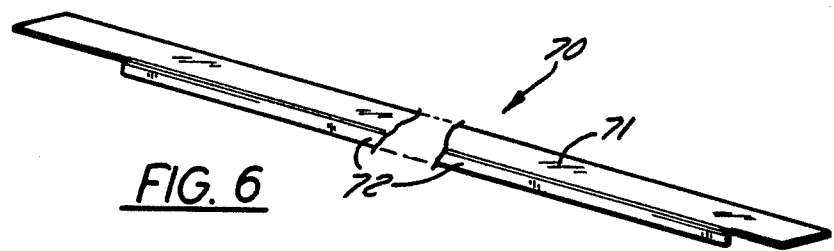
FIG. 6 is a perspective view of a roof reinforcement beam.

Referring to FIG. 6, an elongated metal roof reinforcement beam 70 has an elongated flat rectangular top section 71 having a length which corresponds substantially to the length of the upper roof rail 22, and it includes a down turned flange section 72 which has a length corresponding to the length of the cutout section of the roof 40. The roof reinforcement beam 70 is riveted 74 or otherwise attached to the top of the sheet metal roof 40, above the upper roof rail 22.

The retractor receptor plate 36, which has the driver's harness retractor assembly 34 bolted to it, is bolted in position so that it is sandwiched between the harness anchorage reinforcement beam 50 and the upper roof rail 22. More specifically, the exterior face of the upward projecting tabs 55 and 57 of the harness anchorage reinforcement beam 50 abut up against the interior face of the retractor receptor plate 36. The exterior face of the retractor receptor plate 36 abuts up against the interior face of the upper roof rail 22.

The upward projecting tabs 55 and 57 of the harness anchorage reinforcement beam 50 are spaced apart a distance corresponding to the cutout portion 26 of the upper roof rail 22. The retractor receptor plate 36 is installed into the cutout portion 26 and fastened to the upper roof rail 22. The forward section of the retractor receptor plate 36 is bolted to the forward upward extending tab 55 of the harness anchorage reinforcement beam 50, to the upper roof rail 22 at a point forward of the cutout portion 26, and to the forward reinforcing back plate 62 and weld nut 63. The rear section of the retractor receptor plate 36 is bolted to the rear upward extending tab 57 of the harness anchorage reinforcement beam 50, to the upper roof rail 22 at a point rearward of the cutout portion 26, and to the rear reinforcing back plate 64 and weld nut 65. The upper rear section of the receptor plate 36 is also bolted to the uppermost portion of the roof rail 22 and to the remaining stub portion of the adjacent second forwardmost roof beam 42.

The invention is intended to provide an adequate reinforcement of the driver's harness anchorage so that converted GM vans which include a bay window, or which include a bay window and a raised roof, will comply with federal safety standards. This invention may further be used in combination with a seat belt anchorage system for the mid-position pedestal seat and rear sofa seat, as described in applicant's patent application, for a seat belt anchorage system for a conversion van, Ser. No. 07/771,624 which is being on this same date and which applicant incorporates by reference into this application.

The harness anchorage reinforcement of the present invention was tested in accordance with the requirements of Federal Motor Vehicle Safety Standards (FMVSS). In order to meet the requirements of FMVSS 210—Seat Belt Assembly Anchorages, the anchorages must sustain a belt loading of 3000 pounds on each of the lap and shoulder portions of the belt loops simultaneously. To be more conservative, it was decided to exceed the loop loading requirement by 10%. The tests were conducted at a minimum loop load of 3300 pounds, (6600 pounds total). The bay window and raised roof reinforcements sustained loads which exceeded the requirements of FMVSS 210. The harness anchorage reinforcement system was further tested in combination with the applicant's seat belt anchorage system for a conversion van on a sled test, and it was concluded that the bay window and raised roof reinforcement did not adversely affect the system of front occupant protection designed and built into the driver and passenger positions of the GM vans.

The specific structural details disclosed above are not to be interpreted as limiting, but merely as a basis for the claims and for teaching one skilled in the art to variously employ the present invention in any appropriately detailed structure. Changes may be made and the details of construction and arrangement of the invention without departing from the spirit of the invention, especially as defined in the following claims.

I claim:

1. A harness anchorage reinforcement beam for reinforcing an upper roof rail in a conversion van and for anchoring a harness retractor receptor plate attached to the upper roof rail comprising:
   an elongated metal channel member having a middle portion and an interior side edge and an exterior side forming a U-shaped cross section extending the length of the beam;
   the beam having a length corresponding to the distance from a driver's door post rearward to a second forwardmost vertical sidewall column of the van;
   a flange on one end of the beam extending in a direction opposite of the side edges, with the flange being fastenable to a the driver's door post;
   on the interior side edge a first projecting tab and a second projecting tab, the distance between the tabs corresponding to the length of the harness retractor receptor plate; and
   the beam being engageable with the upper frame rail of the van.

2. A conversion van having a driver's harness anchorage comprising:
   an upper roof rail which extends along the upper driver's side corner from the front to the rear of the passenger compartment of the vehicle;
   a retractor receptor plate attached to the upper roof rail;
   a harness retractor assembly attached to the receptor plate; and
   a harness anchorage reinforcement beam connected to the underside of the roof rail and connected to the retractor plate.

3. A conversion van having a driver's harness anchorage comprising:
   an upper roof rail which extends along the upper driver's side corner from the front to the rear of the passenger compartment of the vehicle;
   a retractor receptor plate attached to the upper roof rail;
   a harness retractor assembly attached to the receptor plate; and
   a harness anchorage reinforcement beam connected to the underside of the roof rail and connected to the retractor plate, wherein the harness anchorage reinforcement beam further comprises:
      an elongated metal channel member having a middle portion engaged with the underside of the roof rail;
      an upward extending interior side edge engaged with a lower interior face of the roof rail;
      an upward extending exterior side edge engaged with lower exterior face of the roof rail;
      on one end of the beam a downward extending flange connected to a driver's door post; and
      on the upward extending interior side edge, an upward projecting forward tab and an upward projecting rearward tab, with the tabs engaged with the forward and rear portions of the retractor receptor plate, respectively.

4. The conversion van according to claim 3, further comprising:
   a reinforcing back plate with a threaded nut welded thereto, the plate being inserted in the upper roof rail and fastened to the harness anchorage reinforcement beam and to the receptor plate.

5. A conversion van having a driver's harness anchorage comprising:
   an upper roof rail which extends along the upper driver's side corner from the front to the rear of the passenger compartment of the vehicle;
   a retractor receptor plate attached to the upper roof rail;
   a harness retractor assembly attached to the receptor plate;
   a harness anchorage reinforcement beam connected to the underside of the roof rail and connected to the retractor plate; and
   a roof reinforcement beam engaged above the upper roof rail and extending substantially along the length thereof.

6. A method of reinforcing the driver's harness anchorage on a conversion van comprising:

providing a reinforcing back plate on the upper roof rail of the van;
connecting a harness anchorage reinforcement beam to the underside of the upper roof rail; and
fastening a receptor plate having a harness retractor assembly attached thereto to the harness anchorage reinforcement beam, to the upper roof rail and to the reinforcing back plate.

7. A method of reinforcing the driver's harness anchorage in a conversion van comprising:
providing a reinforcing back plate on the upper roof rail of the van;
connecting a harness anchorage reinforcement beam to the underside of the upper roof rail;
fastening a receptor plate having a harness retractor assembly attached thereto to the harness anchorage reinforcement beam, to the upper roof rail and to the reinforcing back plate; and
connecting the harness anchorage reinforcement beam to the driver's door post of the van.

8. The method according to claim 7, further comprising connecting an upper roof reinforcement beam above the roof rail.

* * * * *